United States Patent [19]

Eigen

[11] 3,990,156
[45] Nov. 9, 1976

[54] CONSTRUCTED RESPONSE METHOD WITH INVISIBLE ANSWER INDICATOR TO PREVENT CHEATING

[75] Inventor: Lewis D. Eigen, New York, N.Y.

[73] Assignee: Meredith Corporation, Des Moines, Iowa

[22] Filed: Feb. 18, 1975

[21] Appl. No.: 550,548

Related U.S. Application Data

[63] Continuation of Ser. No. 386,586, Aug. 8, 1973, abandoned.

[52] U.S. Cl. .................................................. 35/9 G
[51] Int. Cl.² .......................................... G09B 3/02
[58] Field of Search ..................................... 35/9 G

[56] References Cited
UNITED STATES PATENTS

| 3,363,336 | 1/1968 | Skinner | 35/9 G |
|---|---|---|---|
| 3,363,337 | 1/1968 | Skinner | 35/9 G |
| 3,363,338 | 1/1968 | Skinner | 35/9 G |
| 3,516,177 | 6/1970 | Skinner | 35/9 G |
| 3,650,046 | 3/1972 | Skinner | 35/9 G |
| 3,701,205 | 10/1972 | Wolf | 35/9 G |

OTHER PUBLICATIONS

*Network Analysis*, Second Edition, Van Valkenburg C. 1964 Prentice-Hall, Inc. Title and next pages, pp. 23,24,476.

*Primary Examiner*—William H. Grieb
*Attorney, Agent, or Firm*—Allegretti, Newitt, Witcoff & McAndrews

[57] ABSTRACT

A device for teaching includes a work sheet having a number of sets of response regions. Each response region is comprised of at least one answer area and at least one confirmation area. Invisibly printed answers are generally provided within the confirmation areas. By omitting the answers from selected confirmation areas, it is possible to determine whether a student is making his response in the answer area before seeking a confirmation of the correctness of this answer by making the answer in the confirmation area visible.

3 Claims, 1 Drawing Figure

U.S. Patent
Nov. 9, 1976
3,990,156
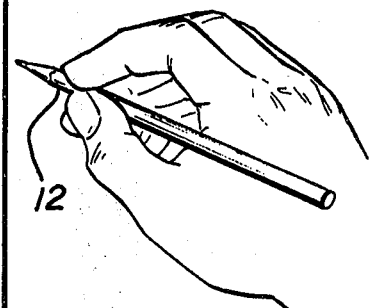

CONSTRUCTED RESPONSE METHOD WITH INVISIBLE ANSWER INDICATOR TO PREVENT CHEATING

This is a continuation of application Ser. No. 386,586, filed Aug. 8, 1973, now abandoned.

BACKGROUND OF THE INVENTION

This invention relates to a device for teaching and more particularly to a teaching device which utilizes invisible ink technology.

Recently issued patents to Skinner U.S. Pat. Nos. 3,363,336, 3,336,337, 3,363,338, 3,516,177 and 3,650,046 disclose various methods and devices for teaching that utilize invisible ink technology. The methods for teaching and the devices disclosed in these prior art patents are very suitable for their intended purposes.

Generally, such devices provide for an inquiry to be made either in writing or orally. The student then makes a response to the inquiry in a designated response area. The response is made by the student utilizing a special invisible ink activator which cooperates with invisible ink printed in the response area on a work sheet. Teaching systems have been developed which utilize the invisible ink technology to reinforce or assist in the learning process. These systems are discussed in greater detail in the above-identified patents.

With the use of invisible ink, it is also possible to provide the student with a confirmation of the correctness of his answer. That is, the student may indicate his answer at one portion of the work sheet and subsequently activate invisible ink printing to determine the correctness of his response. In this manner, the student achieves immediate feedback informing himself of the correctness of his answer to the inquiry and also indicating learning problem areas or serving to reinforce his confidence as he continues with his lesson. Unfortunately, some students activate the confirmation prior to providing their own answer to the inquiry.

Nonetheless, it is still desirable to provide the student with immediate confirmation of the correctness of his answer. Thus, some device or method is needed to encourage the student to provide his own answer before attempting to confirm that answer. One method has been suggested by Skinner in his U.S. Pat. No. 3,650,046. The present invention provides another method and device to encourage the student to respond to inquiries in an order which will promote the student's learning process.

SUMMARY OF THE INVENTION

In a principal aspect, the present invention relates to an improved device for teaching comprising a work sheet having at least one set of response regions. Each response region includes an answer area and a confirmation area. One of the areas is printed in invisible ink with information which either confirms an answer made by the student or instructs the student to avoid confirmation of his answer. For example, the answer area may include an abstract invisible ink pattern which will indicate to the student that he should not go to the confirmation area since the confirmation area will not have the correct answer or any answer.

Another set on the answer sheet may include a confirmation area, in which the correct answer is printed in invisible ink. Those sets which have correct answers in the donfirmation areas will be randomly distributed among sets which have no answer in the confirmation area. The student, not knowing which confirmation areas will provide an answer, will thus be encouraged to place his answer in an answer area and subsequently confirm the answer by referring to confirmation areas. The student does this knowing that the reverse order may leave a telltale sign for the instructor that there was no answer at the confirmation area and subsequently provided an answer in the answer area.

Thus, it is an object of the present invention to provide an improved teaching device and method including means for generally confirming the student's response and also including means to encourage the student to answer the inquiry before revealing a confirmation.

Another object of the present invention is to provide an improved teaching device utilizing invisible ink technology to provide confirmations to student responses.

Still another object of the present invention is to provide an improved teaching device which generally includes a plurality of sets of response regions, each set including at least one answer area and at least one confirmation area, the confirmation area normally providing an invisible ink confirmation to an answer made by the student in the answer area. To encourage students to place their answers in the answer area prior to revealing the confirmation area, randomly selected confirmation areas omit confirmation information.

These and other objects, advantages and features of the present invention will be set forth in the detailed description which follows.

BRIEF DESCRIPTION OF THE DRAWING

The single FIGURE of the drawing illustrates an answer sheet as it would be viewed by a student for use in combination with a writing instrument.

DESCRIPTION OF THE PREFERRED EMBODIMENT

In the following description of the invention, reference will be made to invisible ink, invisible ink activators, writing pens and the like. Typical chemical compositions for the inks as well as the pen and paper construction are disclosed and discussed in the Skinner patents referred to above. The description of these materials is thus incorporated herewith by reference, it being understood that the subject matter of the present invention comprises a new manner of utilizing such materials.

Referring now to the drawing, there is disclosed a work sheet 10 having both visible and invisible information printed thereon. The printed visible information is indicated by the solid lines on the drawing. It includes a legend of the following headings, "Answer", "Confirmation", a question number column, "(1) through (n)" on the left-hand side of the work sheet, answer boxes, confirmation boxes and column head designations, "(1), (2)-(n)" and "(A)(B)-(X)".

The invisible information printed on the work sheet 10 is indicated by solid line, abstract patterns within the answer boxes associated with set numbers 2, 5, 7, 8 and 10. The invisible printed information is indicated by broken lines in confirmation boxes associated with set numbers 3, 4, 7, 8 and 10. The information within confirmation boxes 1 and 2 is activated invisible ink and is thus depicted by solid lines with shading in the boxes to indicate activation of the invisible ink. The remaining printing on the work sheet is discussed in detail below.

A writing instrument 12 is utilized by a student as shown. The writing instrument 12 includes an invisible ink activator and optionally may include a visible die so that the student may make a record of his answers. The student as indicated in answer box 1 may, in response to a written or oral inquiry, provide an answer, e.g., the number 6, in the designated answer box. Subsequently, in order to verify or confirm his answer, the student will rub the same tip of the writing instrument 12 over the confirmation box associated with Set No. 1 to reveal, as indicated in the drawing, the correct answer 6. The student has thus confirmed his answer. Set No. 2 includes an invisible ink pattern within the answer box. This invisible ink pattern as can be seen by the legend indicates to the student that he should not attempt to confirm his answer. If the student in fact confirm to donfirm his answer out of order, that is, before he placed his answer in the answer box, the confirmation box would be blank as illustrated in the drawing or, alternatively, contain some legend such as "no". This alternative is also indicated in the drawing adjacent confirmation box associated with Set No. 2.

The student is thus encouraged to answer the inquiries by first of all providing his answer in the answer box and subsequently checking that answer, when appropriate, in the confirmation box. Consequently with set No. 3, the student should provide the answer "4" in the answer box and then subsequently confirm that answer by activating the invisible ink answer in the confirmation box.

As can be seen by referring to the drawing, Set Nos. 1, 2 and 3 have associated therewith a single answer box and a single confirmation box. It is possible, however, within the spirit and scope of the invention to include a plurality of answer boxes or a plurality of confirmation boxes in various combinations. Referring to Set Nos. 4 and 5, there is disclosed a plurality of answer boxes associated with a single confirmation box.

Set No. 4 could be a multiple choice type inquiry. The student would indicate his choice by making a visible mark in the appropriate answer box. He would then confirm his answer by activating the invisible ink information in the confirmation box. In this instance, the Numeral 3 appears indicating that the student should have checked the third answer box in the sequence.

Set No. 5 is of the same nature as No. 4. Here, however, an identical abstract pattern is included in each answer box. indicating to the student that there will be no confirmation in the confirmation box. Again, this arrangement tends to urge the student to provide an answer before resorting to confirmation since only by providing an answer will the student know whether the confirmation box provides a confirmation.

Set Nos. 6, 7 and 8 illustrate an embodiment wherein a single answer box is associated with a plurality of confirmation boxes. Set No. 6 includes no invisible ink pattern which in this instance may mean that there is confirmation in box C. Set No. 7 discloses a confirmation pattern which according to the legend means that the correct answer will be found in confirmation box B. Set No. 8 includes another abstract symbol which means that confirmation will be found in box A.

Of course, the symbols in answer areas 7 and 8, although abstract are really symbols indicating directions to the student. In other words, the answer areas contain additional directions to the student directing that student to activate a particular confirmation area or avoid activation altogether.

Set Nos. 9 and 10 illustrate still another embodiment wherein a plurality of answer boxes are associated with a plurality of confirmation boxes for each set. Thus, Set No. 10 may involve a multiple choice. Having chosen one of the answers for Set No. 10, the legend then indicates that the correct answer will be found in confirmation box X.

The above description has indicated that the pen 12 may include a colored die as well as the invisible ink acivator in order to record the student's answer as well as activating invisible ink during appropriate circumstances. It is possible, however, to eliminate the colored die. In such an instance, the answer box would include a total area in invisible ink. The path of the pen over that total area would then result in an intelligible scribe and simultaneously, by virtue of the invisible ink pattern in the box, would provide the student with an indication of whether he should check his answer in a confirmation box and, if so, which confirmation box.

Thus, it is to be seen that the present invention provides a means for giving a student rapid confirmation of his answers and progress in learning. Simultaneously the device and method instills within the student a desire to adhere to the order of providing an answer followed by confirmation of his answer. The invention is, therefore, to be limited only by the following claims and their equivalents.

What is claimed is:

1. A device for teaching comprising, in combination: a sheet having a plurality of sets of response regions in serial order, each set including one answer area and one associated confirmation area, at least one of said answer areas comprising an instructive answer area including an invisible ink instructive pattern, the confirmation area associated with the instructive answer area having no visible or invisible ink printed information, at least one other of said answer areas comprising an instructive answer area not having an invisible ink instruction pattern, the confirmation area associated with said other answer area including an invisible ink information pattern;

writing means for activation of said invisible ink and for recording a student response in said areas, whereby the student is to use the writing means to mark his response to each one of a number of serial questions in the associated answer area of the serial set of response regions, and subsequently is to verify his response only in the confirmation areas indicated; and a legend identifying each answer area instructive pattern and setting forth instructions for answer and response verification by reference to only the confirmation area having an invisible ink information pattern.

2. The device of claim 1 including a plurality of answer areas for each set, each answer area of each set being identical.

3. A method of teaching which generally provides immediate answer confirmation to the student and also encourages honest test procedures by the student, said method being one wherein correct answers are provided in invisible ink except in random instances, said method using means for activating the invisible ink, said means simultaneously providing a visible ink mark, said method comprising, in combination, the steps of:
 a. providing an answer sheet having a plurality of sets of visibly indicated response regions in serial order, each set including one answer area and one associated confirmation area;
 b. providing an invisible ink instructive pattern in at least one of the answer areas, the associated confirmation area not including invisible ink printing;
 c. providing at least one other answer area not having an invisible ink instructive pattern, the confirmation area associated with said other answer area including an invisible ink information pattern;
 d. providing a question for each set;
 e. providing a legend of answer areas which identifies the answer area instructive pattern and sets forth instructions for answer area response verification by reference to only the confirmation area having an invisible ink information pattern; and
 f. sequentially applying the means for activating to each answer area and subsequently to the associated confirmation area whenever no instructive pattern is made visible in the answer area whereby confirmation areas developed in improper sequence are immediately and permanently recorded.

* * * * *